United States Patent [19]
Sinker, Jr. et al.

[11] Patent Number: 5,948,369
[45] Date of Patent: Sep. 7, 1999

[54] METHOD AND APPARATUS FOR EXHAUSTING GASES FROM PROCESSING TANK

[75] Inventors: Paul W. Sinker, Jr., East Stroudsburg, Pa.; Brendan J. Meiers, Plainsboro, N.J.

[73] Assignee: Benjamin Moore & Co., Montvale, N.J.

[21] Appl. No.: 08/660,669

[22] Filed: Jun. 5, 1996

[51] Int. Cl.⁶ ............................. B01D 50/00; B01D 19/00
[52] U.S. Cl. ............................................... 422/168; 55/218
[58] Field of Search ................................. 422/168; 55/218

[56] References Cited

U.S. PATENT DOCUMENTS

| | | | |
|---|---|---|---|
| 4,215,716 | 8/1980 | Klenk et al. | 137/527.4 |
| 4,441,934 | 4/1984 | Kawakami | 148/9 R |
| 4,714,010 | 12/1987 | Smart | 98/115.4 |

*Primary Examiner*—Ponnathapura Achutamurthy
*Assistant Examiner*—Hankyel T. Park
*Attorney, Agent, or Firm*—William E. Mouzavires

[57] ABSTRACT

An exhaust system for a liquid processing vessel or tank including a port provided in a cover of the tank and a closure fixed in the tank to close the port when the cover in a closed position closing the space enclosed by the tank. The cover is movable to an open position and fumes or vapors from the liquid in the tank are removed through the port and a conduit communicating with the port and an exhaust passage in which suction is produced to remove the vapors. When the cover is moved to its closed position closing the tank to allow processing of the liquid, the closure blocks the port in the cover.

28 Claims, 2 Drawing Sheets

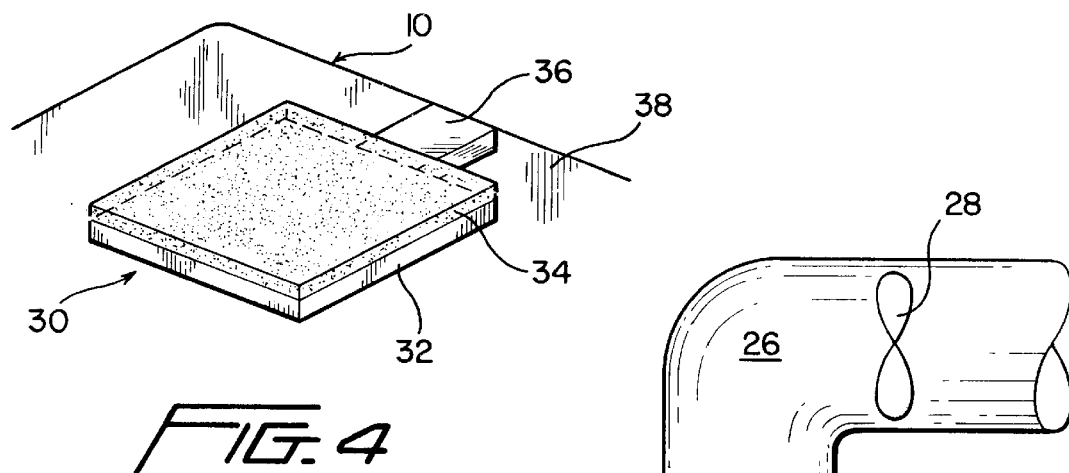
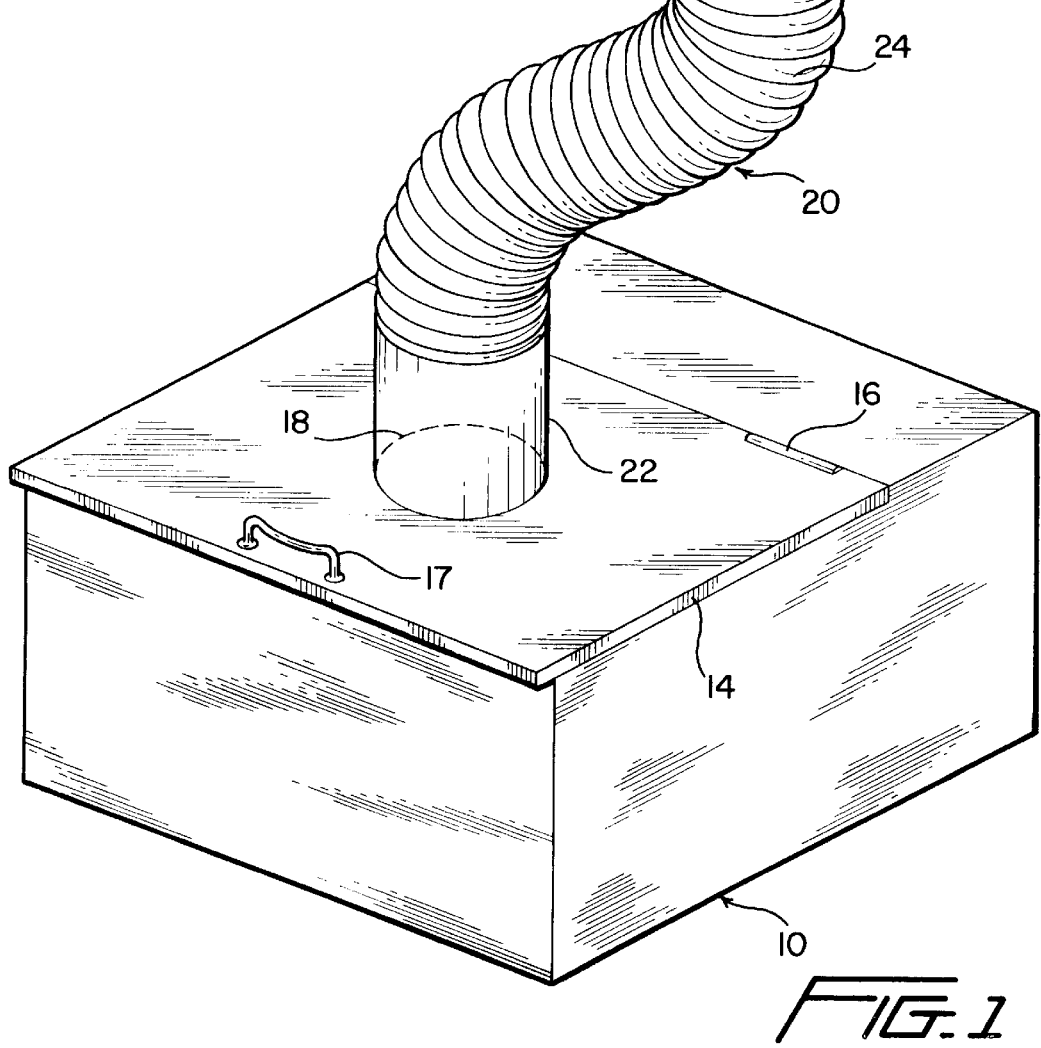

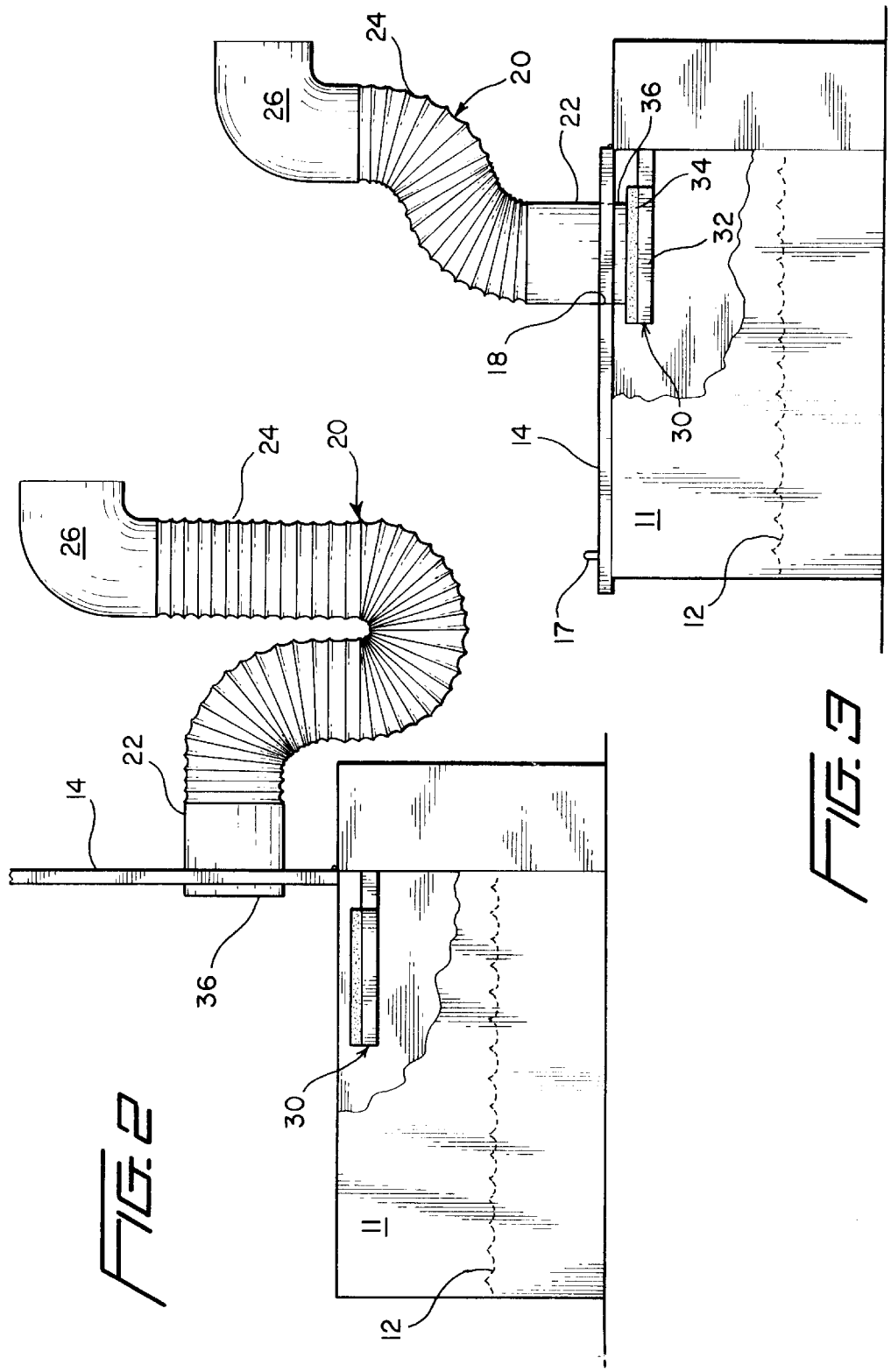

METHOD AND APPARATUS FOR EXHAUSTING GASES FROM PROCESSING TANK

OBJECTS OF THE PRESENT INVENTION

The present invention generally relates to processing vessels or tanks and more specifically to novel method and apparatus for exhausting gases such as vapors or fumes from liquids being processed in the tank. Although the invention is particularly useful in the processing of alkyd and latex paint liquids to remove vapors of mineral spirits, ethylene glycol, ammonia, methyl ethyl ketoxime, texanol and propylene glycol, the invention need not be limited to such liquids and/or vapors.

An object of the present invention is to provide novel and improved method and apparatus for safely exhausting or removing unwanted vapors or gases from vessels or tanks used in industry for processing liquids. Included herein is such apparatus that may be relatively inexpensive and easy to instal and operate in connection with new or existing processing tanks or vessels.

A further object of the present invention is to provide a novel and improved liquid processing tank or vessel that is equipped with apparatus that will contain unwanted gases or fumes within the tank during processing of liquids therein but will facilitate safe removal and exhaust of gases or fumes when the tank is opened for inspection or for supplying the tank with liquids or other substances.

SUMMARY OF INVENTION

One preferred form of the invention utilizes an exhaust port provided in a cover of a processing tank. The cover is movable between a closed position closing the inside of the tank which receives the liquids to be processed, and an open position which exposes the inside of the tank for inspection of its contents or for supplying the tank with liquids. A closure is fixed inside the tank to close the port when the cover is in closed position, closing the tank so that the inside of the tank including liquids being processed and vapors is sealed from the ambient surroundings of the tank. An exhaust conduit is connected to the cover in communication with the port so that when the cover is moved to open position, fumes and gases in the tank will be exhausted through the port in the cover and the conduit and then through an exhaust passage in a suction duct which leads to a suitable, environmentally safe, discharge terminal area. Fumes and gases are conveyed through the exhaust port conduit and passage through a suction generated by any suitable vacuum motor. When the cover is returned to closed position, its exhaust port will be closed by the closure in the tank so that no vapors or gases will escape the tank through the port during processing of liquids in the tank.

DRAWINGS

Other objects and advantages of the present invention will become apparent from the more detailed description below in conjunction with the attached drawings in which:

FIG. 1 is a perspective view of apparatus including the exhaust system of the present invention;

FIG. 2 is a side elevational view of the apparatus shown in FIG. 1 but with a cover of a tank included therein shown in open position;

FIG. 3 is a view generally similar to FIG. 2 but with the cover shown in closed position; and FIG. 4 is a fragmental, perspective view of a closure included in the tank of the apparatus.

DETAILED DESCRIPTION

Referring now to the drawings in detail there is shown for illustrative purposes only apparatus constituting a preferred embodiment of the present invention. The apparatus includes a vessel or tank generally designated 10 having a generally rectangular shape including a base, opposite side and end walls enclosing a space 11 for receiving a liquid 12 to be processed. Although shown as rectangular in shape, the tank 10 may have any other shape. In one use of the tank for processing alkyd and latex paints, the tank 10 has a capacity of 1375 gallons, however other liquids, sizes and capacities may be used in carrying out the present invention.

The top of the specific tank 10 shown is closed by a cover generally designated 14 having a generally rectangular shape, FIGS. 1 and 3 showing the cover 14 in the closed position. In order to provide access into the interior space 11 of the tank, the cover 14 is mounted for movement to an open position shown in FIG. 2. The open position of the cover 14 allows inspection or supply of liquid 12 into the tank. In the shown embodiment, the cover is mounted for pivotal movement between its open and closed positions by any suitable means such as hinges, one shown at 16. Any suitable handle 17 may be provided for raising and lowering cover 14. Liquid 12 is removed from the tank 10 by a discharge valve (not shown) in the base of the tank. The tank 10 may be made from any suitable material such as metal, plastic, or wood or a combination of these materials. Moreover it is preferred that the underside of the cover include a flexible material for establishing a seal along the top of the side walls of the tank when the cover 14 is in the closed position.

In accordance with the present invention, a novel system is provided for exhausting gases, fumes, or vapors from the interior 11 of the tank to an exhaust passage formed in a duct 26 external of the tank. Duct 26 contains a vacuum fan 28 for driving unwanted gases through the duct to a suitable discharge, environmentally safe area (not shown). The system includes the provision of a discharge port 18 through the cover 14 for receiving an exhaust duct generally designated 20. In the specific embodiment shown, exhaust duct 20 includes a sleeve 22 received through port 18 while being fixed to the cover 14; and a flexible conduit portion 24 having one end fixed to sleeve 22 and an opposite end fixed to exhaust duct 26. The interior of the flexible conduit 24 is of course in communication with the interior of sleeve 22 and duct 26 to establish an exhaust passage from within the tank to the duct 26 when the cover 14 is raised to open position shown in FIG. 2. Vacuum fan 28 will of course draw gases, vapors, etc. from within the tank through exhaust conduit 20 and into exhaust duct 26 which leads to a safe discharge-disposal area.

When the cover 14 is closed as shown in FIGS. 1 and 3, the exhaust duct 20 is closed at one end by a closure generally designated 30. Closure 30 is fixed to the wall of the tank in a position to close the duct 22 when cover 14 is moved to closed position as shown in FIGS. 1 and 3. In the specific embodiment shown, sleeve 22 has its outer end 36 projecting as a lip from the bottom side of cover 14 to be engageable with closure 30 as shown in FIG. 3 to close the one end of exhaust duct 20. In the specific form shown closure 30 extends in a generally horizontal plane adjacent the rear wall 38 (FIG. 4) of the tank to which it is fixed by a bracket arm 36 in any suitable manner. The specific embodiment also utilizes a duct sleeve 22 having an internal diameter of about six inches (6"). The closure 30 has an area greater than six square inches to insure effective seating of duct lip 36. Moreover it is preferred that closure 30 have a resilient flexible pad 34 such as, for example, foam rubber for insuring a continuous circumferential seal between the duct lip 36 and closure pad 34 when the cover is in closed position.

It will thus be seen that during processing of the liquids in the tank, the gases, fumes, etc. will not escape the tank. However when the cover 10 is moved to open the tank for inspection, or supply of liquid, the exhaust fan 20 will become effective to draw the gases from the top of the tank through exhaust ducts 20 and 26 and then to a suitable discharge area. In the specific embodiment shown, the vacuum fan has a capacity to generate 490 cubic feet per minute of vacuum.

Although one specific embodiment of the invention has been shown and described above, the invention is not to be limited to this embodiment but rather the scope of the invention is indicated in the appended claims and will cover various modifications readily apparent to those of ordinary skill in the art.

We claim:

1. A method of exhausting gases including fumes and vapors from a processing tank enclosing a space including a substance and a cover for the tank itself movable between a closed position closing the space and an open position opening the space; the method comprising the steps of providing a port in the cover communicating with an exhaust system externally of the tank, providing a closure in the tank closing said port when the cover is in said closed position and being spaced from said port when the cover is in said open position, and exhausting gases from the tank through said port and into said exhaust system when the cover is moved from said closed toward said open position.

2. The method defined in claim 1 wherein said space enclosed by the tank has an upper portion located above the substance in the tank, including the step of locating the closure in a fixed position in said upper portion of the tank and below said cover so that the port is in general alignment with and closed by said closure when the cover is in said closed position.

3. The method defined in claim 1 including the step of using a flexible conduit to interconnect said port and said exhaust system.

4. The method defined in claim 2 including the step of using a flexible conduit to interconnect said port and said exhaust system.

5. The method defined in claim 4 including the step of using a flexible material on said closure for closing and sealing said port when the cover is in said closed position.

6. A system for exhausting gases from a processing container such as a vessel or a tank, comprising in combination: a container enclosing a space for receiving and processing substances, a cover for the tank itself movable between a closed position closing said space and an open position for opening said space, said cover having a port therein, means defining an exhaust passage external to the container, a connecting conduit between said exhaust passage and said port, and a closure in said space below the cover closing said port when said cover is in said closed position, said cover being movable away from said closure upon moving toward said open position whereby gases in the tank may be exhausted through said port and conduit and into said passage.

7. The system defined in claim 6 including suction means for drawing gases from said space through said port and conduit and into said passage when the cover is in said open position thereof.

8. The system defined in claim 6 wherein said closure is fixed in an upper portion of said tank to be above the level of substances processed in the tank.

9. The system defined in claim 8 wherein said closure extends generally in a plane to be aligned with said port when the cover is in said closed position.

10. The system defined in claim 8 wherein said closure includes flexible material for closing and sealing said port when said cover is in said closed position.

11. The system defined in claim 9 wherein said closure extends in a generally horizontal plane.

12. The system defined in claim 6 wherein said conduit has an annular lip projecting below said port into engagement with said closure when the cover is in said closed position.

13. The system defined in claim 6 wherein said conduit is flexible and said cover is mounted for pivotal movement between said positions thereof.

14. The system defined in claim 6 including suction means for drawing gases from the container space through said port and conduit and into said exhaust passage when said cover is moved into open position.

15. The system defined in claim 6 wherein said container is of a size and material to hold at least 1375 gallons of liquid, said conduit and port having a diameter of approximately six inches, and said suction means is capable of generating at least 490 cubic feet of vacuum per minute.

16. A tank for processing gases comprising a body enclosing a space for receiving fluids to be processed, an opening in said body communicating with said space for introducing substances into or for inspecting or processing substances in said tank, a cover member movable between a closed position covering said opening and an open position uncovering said opening, said cover member having a port extending through the cover member through opposite sides thereof, and a closure in said space for closing said port when the cover member is in said closed position.

17. The tank defined in claim 16 further including an external conduit fixed to said cover member in communication with said port.

18. The tank defined in claim 17 wherein said conduit has a lip projecting from the cover member to engage said closure when said cover member is in said closed position.

19. The tank defined in claim 16 wherein said closure is fixed in position within said tank.

20. The tank defined in claim 16 wherein said cover member forms a top wall portion of said tank when in said closed position, and said closure member extends in a generally horizontal plane in fixed position within the tank and in general alignment with said port when said cover member is in said closed position.

21. The tank defined in claim 20 wherein said cover member is mounted to the tank for pivotal movement between said positions thereof.

22. The tank defined in claim 20 wherein said closure includes a flexible pad for closing and sealing said port.

23. The tank defined in claim 22 wherein said closure includes flexible material for engaging said lip to seal said port when the cover member is in said closed position.

24. The tank defined in claim 17 wherein said conduit is flexible to accommodate movement of said cover member between said positions thereof.

25. A system for exhausting gases from a processing container such as a vessel or tank, comprising in combination: a container enclosing a space for receiving and processing substances, a cover for the container itself movable between a closed position closing said space and an open position for opening said space, means defining an exhaust passage on the cover external to the container, and means including a closure closing said exhaust passage when said cover is in said closed position and opening said exhaust passage when said cover is in said open position whereby gases in the tank may be exhausted through said passage when said cover is in said open position.

26. The system defined in claim 25 where said closure is located adjacent to the cover when the cover is in said clogged position.

27. A method of exhausting gases including fumes, and vapors from a processing tank enclosing a space including a substance and a cover for the tank itself movable between a closed position closing the space and an open position opening the space; the method comprising the steps of providing an exhaust system externally of the tank and including an exhaust passage, and providing a closure closing said passage when the cover is in said closed position and opening said passage when the cover is in said open position for exhausting gases from the tank through said passage when the cover is in said open position.

28. The system defined in claim 26 wherein the closure is located on the tank.

* * * * *